US012683478B2

(12) United States Patent
    Searles et al.

(10) Patent No.: US 12,683,478 B2
(45) Date of Patent: Jul. 14, 2026

(54) THERMAL MITIGATION USING CURRENT REDISTRIBUTION

(71) Applicant: Apple Inc., Cupertino, CA (US)

(72) Inventors: Shawn Searles, Austin, TX (US);
    Jae-Hong Hahn, Sunnyvale, CA (US);
    Hubert Attah, Santa Clara, CA (US)

(73) Assignee: Apple Inc., Cupertino, CA (US)

( * ) Notice: Subject to any disclaimer, the term of this
    patent is extended or adjusted under 35
    U.S.C. 154(b) by 111 days.

(21) Appl. No.: 18/443,651

(22) Filed: Feb. 16, 2024

(65) Prior Publication Data

US 2025/0266750 A1 Aug. 21, 2025

(51) Int. Cl.
    *H02M 1/00* (2007.01)
    *H02M 1/32* (2007.01)

(52) U.S. Cl.
    CPC ....... *H02M 1/0048* (2021.05); *H02M 1/0009*
    (2021.05); *H02M 1/327* (2021.05)

(58) Field of Classification Search
    CPC .... H02M 3/1582; H02M 3/156; H02M 3/157;
    H02M 3/158; H02M 3/1584; H02M
    3/1586; H02M 3/285; H02M 3/33561;
    H02M 7/49; H02M 1/045; H02M 7/006;
    H02M 7/06; H02M 7/068; H02M 7/153;
    H02M 7/10; H02M 1/083; H02M 7/103;
    H02M 7/106; H02M 7/19; H02M 7/08;
    H02M 7/17; H02M 2001/007; H02M
    7/493; H02M 7/53806; H02M 7/5381;
    H02M 7/483; H02M 7/217; H02M
    7/538466; H02M 7/5387; H02M 7/53871;
    H02M 7/53873; H02M 7/53875; H02M 1/084; H02M 1/0845; H02M 1/007;
H02M 1/0009; H02M 1/0095; H02M
1/08; H02M 1/088; H02M 3/1588; H02M
7/5395; H02M 1/14; H02M 1/0043;
H02M 1/0074; H02M 1/0077; H02M
1/0045; H02M 1/0006; H02J 3/46; H02J
3/38
See application file for complete search history.

(56) References Cited

U.S. PATENT DOCUMENTS 8,742,622 B2 * 6/2014 Richards, III .......... H02M 1/32
                                              363/148
10,594,219 B2 3/2020 Mirjafari et al.
                    (Continued)

FOREIGN PATENT DOCUMENTS

WO WO-2019224165 A1 * 11/2019 .......... H02M 3/1584

*Primary Examiner* — Jeffrey A Gblende
(74) *Attorney, Agent, or Firm* — Kowert, Hood, Munyon,
Rankin & Goetzel, P.C.; Paul T. Seegers; Dean M.
Munyon

(57) ABSTRACT

Thermal mitigation using current redistribution is disclosed.
A power converter includes plurality of phases configured to
provide a demand current to a load circuit. The power
converter further includes a control circuit configured to
activate selected ones of the plurality of phases based on the
demand current. A plurality of temperature sensors distrib-
uted among the plurality of phases. A state machine is
coupled to receive temperature readings from ones of the
plurality of temperature sensors. The state machine is con-
figured to cause the control circuit to increase a number of
active ones of the plurality of phases in response to receiving
a temperature reading from one of the temperature sensors
that exceeds a first temperature threshold.

17 Claims, 12 Drawing Sheets

(56) References Cited

U.S. PATENT DOCUMENTS

| | | | |
|---|---|---|---|
| 11,005,370 B2 | 5/2021 | Tt et al. | |
| 11,569,747 B2 * | 1/2023 | Agrawal | H02M 1/0032 |
| 11,594,961 B2 | 2/2023 | Tschirhart et al. | |
| 11,863,064 B2 * | 1/2024 | Sblano | H02M 3/1584 |
| 2011/0115447 A1 | 5/2011 | Lin et al. | |
| 2015/0207400 A1 | 7/2015 | Shenoy et al. | |
| 2016/0139619 A1 | 5/2016 | Goth et al. | |
| 2022/0109368 A1 | 4/2022 | Zhou et al. | |
| 2023/0412074 A1 * | 12/2023 | Giuliano | H02M 1/42 |

* cited by examiner

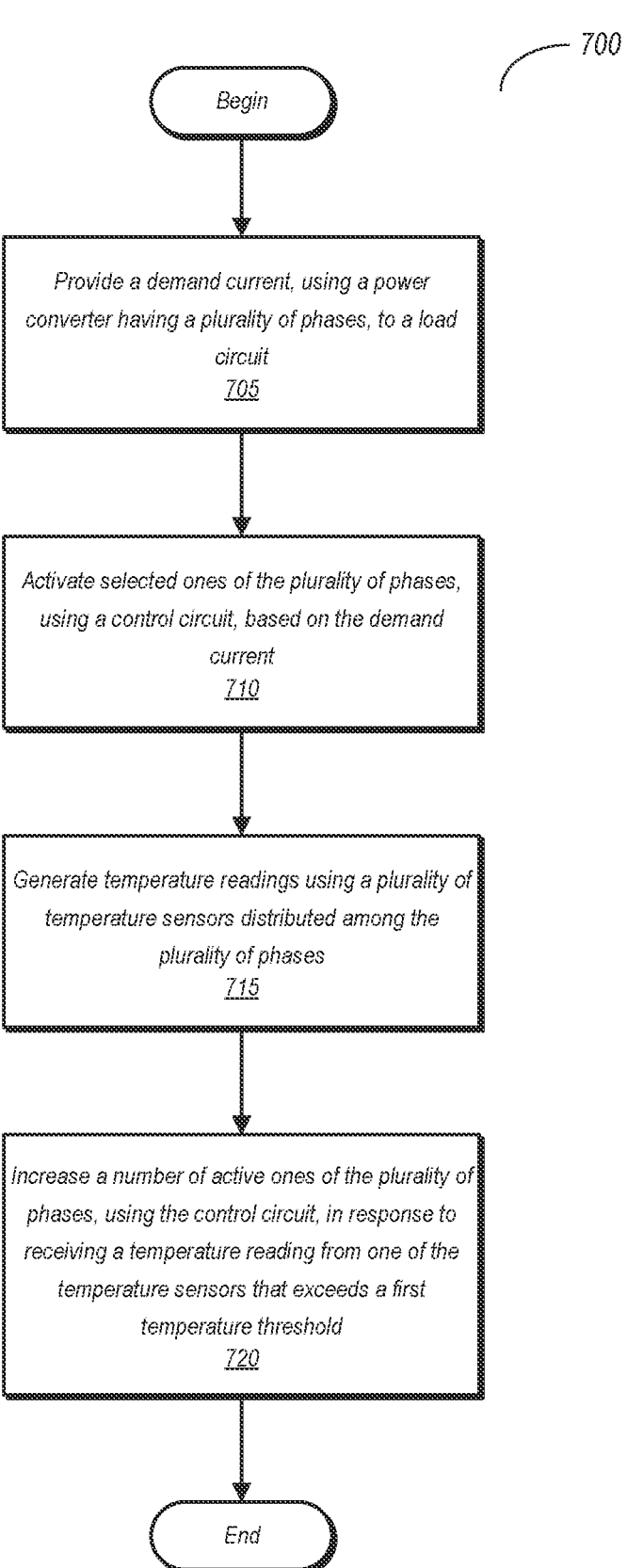

700

Begin

Provide a demand current, using a power converter having a plurality of phases, to a load circuit
705

Activate selected ones of the plurality of phases, using a control circuit, based on the demand current
710

Generate temperature readings using a plurality of temperature sensors distributed among the plurality of phases
715

Increase a number of active ones of the plurality of phases, using the control circuit, in response to receiving a temperature reading from one of the temperature sensors that exceeds a first temperature threshold
720

End

Fig. 7

THERMAL MITIGATION USING CURRENT REDISTRIBUTION

BACKGROUND

Technical Field

This disclosure is directed to electronic circuits, and more particularly, to switching power converter circuits having multiple phases.

Description of the Related Art

Switching power converters are well known in the electronic arts. Switching power converters include buck converters, in which the output voltage is less than the input voltage, and boost converters, in which the output voltage is greater than the input voltage. Such switching converters may trade voltage and current in the buck or boost operation, and may provide greater efficiency than linear voltage regulators.

Some switching converters includes a pair of switches (e.g., transistors). One of the switches, when closed, couples an energy storage element (e.g., an inductor) to an input voltage source at a node sometimes referred to as a switch node. Another switch couples the switch node to a ground or reference node. The two switches operate on opposite phases, and thus the status of the switch node alternates between charging and discharging the energy storage element. The voltage across the energy storage element is averaged out (although some ripple may be present) and provided as a regulated DC supply voltage to a load circuit.

Some power converters may be implemented in multiple phases. That is, a power converter may include multiple phase circuit each having a corresponding set of switches coupled to a corresponding set of multiple reactive elements. These phase circuits may be activated or deactivated depending on current demanded by a load circuit. In high current demand situations, additional phase circuits may be activated to enable sufficient current to the load while maintaining regulation of the output voltage.

SUMMARY

Thermal mitigation using current redistribution is disclosed. In one embodiment, a power converter includes plurality of phases configured to provide a demand current to a load circuit. The power converter further includes a control circuit configured to activate selected ones of the plurality of phases based on the demand current. A plurality of temperature sensors distributed among the plurality of phases. A state machine is coupled to receive temperature readings from ones of the plurality of temperature sensors. The state machine is configured to cause the control circuit to increase a number of active ones of the plurality of phases in response to receiving a temperature reading from one of the temperature sensors that exceeds a first temperature threshold.

BRIEF DESCRIPTION OF THE DRAWINGS

The following detailed description makes reference to the accompanying drawings, which are now briefly described.

FIG. 7 is a flow diagram of one embodiment of a method for operating a power converter.

DETAILED DESCRIPTION OF EMBODIMENTS

Figure 1:
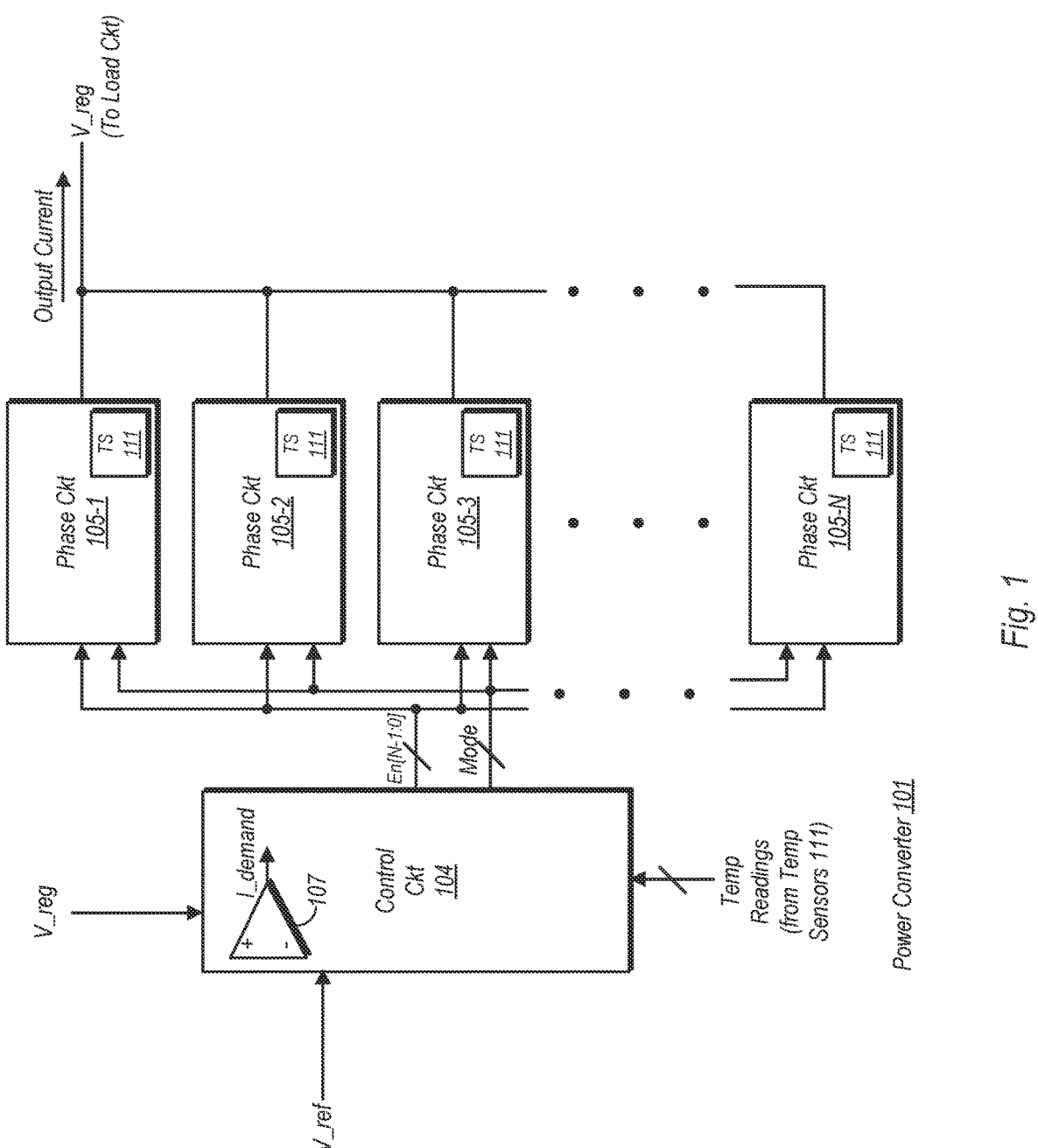
FIG. 1 is a block diagram of one embodiment of a power converter.

In switching power converters, there are energy losses during operation. At low demand currents, these losses are mostly due to switching losses (e.g., ripple current in the inductor and $CV^2$ losses in the switches). At higher demand currents, these losses become a function of a square of the current multiplied by a resistance, or $I^2R$ (referred to hereinafter as "$I^2R$ losses"). Such losses produce a high amount of thermal output, which raise the system temperature, as well as the local temperature in the switching power converter.

The thermal output described above can occur in single-phase converters, but may also occur in individual phases of a multi-phase converter. Left unchecked, the thermal output could potentially damage a phase of a multi-phase switching power converter.

The present disclosure makes use of the insight that, since $I^2R$ losses are a function of the square of the current, reducing the current provided by an active phase of a power converter can result in a significant reduction in such losses therefrom (and thus, a reduction in thermal output). For example, if the current from an active phase are reduced by one-half, the $I^2R$ losses are reduced to one-fourth of their pre-halving value.

In light of this insight, the present disclosure is directed to thermal mitigation in a multi-phase power converter by distributing current among a plurality of phases. In one embodiment, temperature readings may be received by temperature sensors in each of a plurality of phases of a multi-phase power converter, where some phases may be inactive at a given time. In response to detection of a temperature exceeding a threshold value, additional phases may be activated. The activation of additional phases distributes the demand current among these additional phases, thereby reducing the $I^2R$ losses and thus thermal output.

The manner of increasing the number of phases may vary from embodiment to embodiment. In one embodiment, a state machine may double a number of currently active phases in response to a temperature exceeding a threshold.

This in turn reduces the PR losses of the active phases by a factor of four, and can result in significant reduction in thermal output per phase. However, the disclosure is not limited in this manner, as the number of phases that are additionally brought online to reduce thermal output and FR losses may vary from one embodiment to the next.

The ability to distribute demand current among additional phases of a multi-phase power converter may allow for a significant reduction in FR losses and thermal output in individual phases of the power converter. Furthermore, this may be accomplished without compromising regulation of the supply voltage generated by the power converter, and without compromise to telemetry that is used to report the current demanded by the various loads coupled thereto.

Various embodiments of a power converter that utilizes current distribution for thermal mitigation are now discussed in further detail. The discussion begins with an embodiment of a power converter and components thereof that may be used to redistribute current among multiple phases for the purposes of thermal mitigation, as well as a power converter implemented on multiple integrated circuits. Various methods of operating a power converter are then discussed. A device that may be powered by a power converter according to the disclosure, example applications, and a computer readable medium are also discussed.

Multi-Phase Power Converter:

FIG. 1 is a block diagram of one embodiment of a multi-phase power converter. In the embodiment shown, power converter 101 includes multiple phase circuits 105 (e.g., 105-1, 105-2, and so on), and a control circuit 104. Each of the phase circuits 105 may include, or may be implemented near a temperature sensor 111. Power converter 101 is configured to generate a regulated supply voltage, V_reg, that is provided to a load circuit at some output current value. Control circuit 104 may carry out control of the phases, and may include an error amplifier 107 that generates a demand current signal, I_demand, by comparing the reference voltage, V_ref, to the regulated supply voltage, V_reg.

Phase circuits 105 may be one of a number of different types of power converter circuits that may be implemented in a multi-phase converter. In one embodiment, each of the phase circuits may be a buck converter, or switching power converter that generates a regulated supply voltage that is less than the input voltage. Other types of power converter circuits are possible and contemplated. Power converter 101 is coupled to receive an input voltage, V_in, from an external source, with this voltage being provided to each of the phase circuits 105. The phase circuits 105 in turn, when activated, collectively produce a voltage of V_reg, on their respective and shorted outputs (which are connected to a common output node).

It is noted that the phase circuits 105 are not necessarily identical in all embodiments (although they can be in some embodiments). For example, some phase circuits 105 may be capable of providing the regulated output voltage at higher demand current values than other ones. Furthermore, although not explicitly shown here, some of the phase circuits 105 may be implemented on a different integrated circuit die than other ones of the phase circuits.

Temperature sensors 111 may be implemented with any suitable temperature sensing circuitry, and may thus sense the current temperature of their corresponding phase circuit 105. For example, temperature sensors may be implemented using ring oscillators, ΔVbe/bandgap circuits, or any other commonly used temperature sensing circuit. Although not shown here, each of the temperature sensors may be coupled to a telemetry bus to enable the reporting of temperature readings to other components, such as control circuit 104.

Control circuit 104 in the embodiment shown is configured to carry out control functions for power converter 101. These control functions include activating various phase circuits 105 to provide a higher current to a load circuit (e.g., under heavy workload conditions), deactivating various phase circuits 105 (when less current is needed by the load), changing operating modes of the various phase circuits (e.g., between PFM, pulse frequency modulation, and PWM, pulse width modulation), and so on. Control circuit 104 in the embodiment shown is configured to receive a reference voltage, V_ref, and is configured to cause power converter 101 to provide the regulated supply voltage V_reg in accordance therewith. Accordingly, in response to detecting a change in the reference voltage, control circuit 104 may adjust the level of the regulated supply voltage by modulating the amount of current produced by each phase circuit 105. As noted above, an error amplifier 107 may generate a demand current signal, I_demand, by comparing V_reg and V_ref. The demand current signal may be used in carrying out control functions, including the determining of the number of phases that are to be active at any given time, as well as operational parameters for the active phases (e.g., pulse width, etc.). In some embodiments, the demand current signal or a derivative thereof may be provided to each of the phase circuits 105 to allow some control functions to be carried out locally.

In addition to activating and deactivating various phase circuits 105 based on changing conditions with respect to the load circuit or desired regulated supply voltage, control circuit 104 may also perform activation and deactivation of phase circuits 105 based on thermal conditions. In the embodiment shown, control circuit 104 is configured to receive temperature readings from each of the temperature sensors 111 associated with corresponding phase circuits 105. As will be discussed in further detail below, control circuit 104 may include comparison circuitry configured to compare the temperature readings to a number of different temperature thresholds. Based on these comparisons, control circuit 104 may activate additional phase circuits 105 (irrespective of demand current). As noted above energy losses by individual phase circuits, are based on a square of the current and the resistance encountered thereby, or $I^2R$ losses. These energy losses may manifest themselves in thermal output that raises the temperature of the circuits. Accordingly, increasing the number of active phases when a particular temperature sensor 111 reports a temperature greater than a particular threshold value may reduce these losses for the affected phase circuits.

For example, if two phase circuits 105 are active, and a corresponding temperature sensor reports a temperature reading exceeding a particular temperature threshold, control circuit 104 may activate two additional phase circuits 105. This doubling of the number of active phase circuits may then reduce the $I^2R$ losses of the affected phase circuits 105, since each of the four activated phase circuit 105 will be providing one half the current than was provided by the two that were previously activated. Furthermore, the mitigation of thermal output by a given phase circuit 105 may be carried out without any compromise to regulation of the output voltage, V_reg, since the number of phase circuits 105 contributing to the demand current has increased.

While the disclosure includes N phase circuits, it is noted that the actual number of phase circuits may be any suitable number. The present disclosure contemplates a multi-phase power converter with as few as two phase circuits, with the number limited only by practical considerations of a particular implementation.

As used herein, a specific configuration of a power converter according to the disclosure, including power converter 101, is referred to as a gear. A gear as defined herein refers to a state of the power converter having a particular number of phase circuits activated. For example, a first gear might have a particular number of phases activated. A second, higher gear may have a greater number of phase circuits activated relative to the first gear, and so on. The act of increasing a number of active phase circuits may be referred to as moving up to the next gear, or moving to a higher gear. The act of decreasing a number of active phase circuits may be referred to as moving down by a gear, or moving to a lower gear. In one (non-limiting) embodiment, moving up to a higher gear may comprise doubling a number of active phase circuits, while moving down to a lower gear may comprise reducing the number of active phase circuits by half. Thus, in this example embodiment, each successive gear has twice the number of phase circuits active as its closest lower gear.

The disclosure further contemplates that, in some embodiments, there may be states of operation that fall between the defined gears. For example, if a power converter according to the disclosure is operating in a particular gear, and additional phase circuits are necessary to maintain regulation and/or meet demand current, with no thermal conditions invoking a move up to a higher gear, one or more additional phase circuits may be activated without increasing the number by a full gear. Changing the number of active phase circuits by less than a full gear is referred to herein as changing by a partial gear. To use one example, if a gear for a particular embodiment involves changing the number of active phase circuits by a factor of two, and a power converter according to the disclosure is active in a gear with four active phase circuits, it may change the number by a partial gear by activating one additional phase circuit if needed to maintain regulation of the supply voltage output therefrom.

Figure 2:
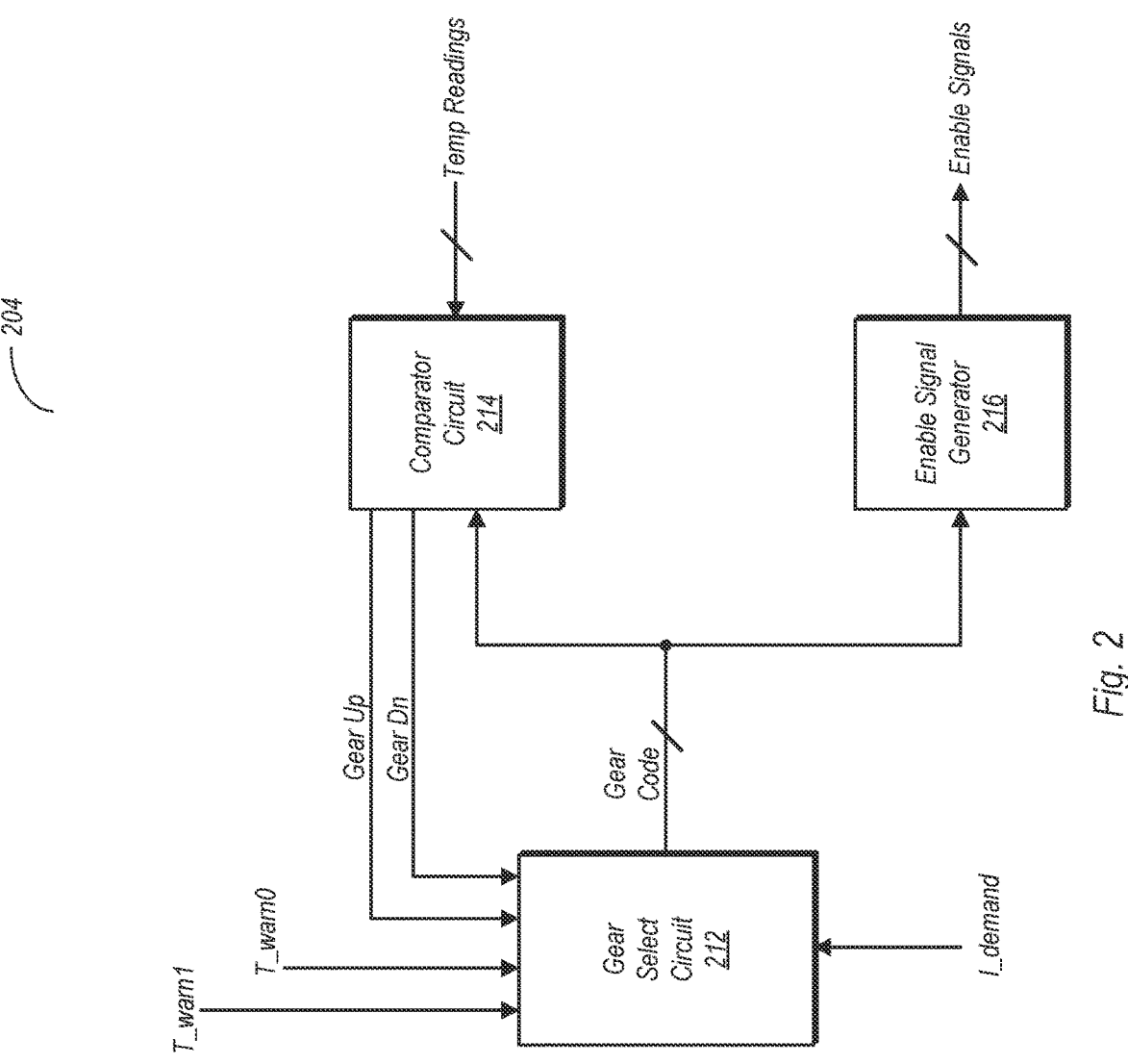
FIG. 2 is a block diagram of one embodiment of a control circuit for a power converter.

FIG. 2 is a block diagram of one embodiment of a control circuit configured to perform thermal mitigation using current distribution. It is noted that while control circuit 204 in the embodiment shown may also be configured to activate, deactivate, and generally control phase circuits of the power converter to adjust for other parameters (e.g., demand current and maintaining regulation), these functions are not discussed in detail here, although the absence of such discussion does not negate their presence in various embodiments.

In the embodiment shown, control circuit 204 includes a gear select circuit 212, a comparator circuit 214, and an enable signal generator. It is noted that while the operation of control circuit 204 is discussed in this disclosure as operating to change the number of active phases based on temperature, it may also adjust the number of active phases based on other parameters such as demand current, etc., in order to regulate the supply voltage to a specified level. Such control actions to change the number of active phases may be carried out in the absence of any thermal conditions that might otherwise invoke a similar change. Thus, while this disclosure only minimally elaborates on the operation of control circuit to meet demand current and regulate the supply voltage to a specified level in absence of such thermal conditions, this functionality may nevertheless be present.

In the embodiment shown, comparator circuit 214 is configured to receive temperature readings from temperature sensors distributed among the various phase circuits of a power converter that includes control circuit 204. In one embodiment, a telemetry bus may be used to convey temperature readings to comparator circuit 214. However, other mechanisms are also possible and contemplated, and thus the telemetry bus example is not intended to be limiting.

Comparator circuit 214 may utilize the temperature readings and a gear code received from gear select circuit in performing comparisons. Using the gear code, comparator circuit 214 may determine which thresholds to be used for comparisons against the temperature readings. In some embodiments, comparator circuit 214 may perform comparisons sequentially, one temperature reading at a time. Embodiments are also possible and contemplated in which the comparisons are performed in parallel as well. In some embodiments, additional functions may be performed in conjunction with the comparisons, such as averaging the temperature readings, determining the deltas between the various temperature readings and the thresholds used for comparison, and so on.

The comparisons and calculations carried out by comparator circuit 214 may be accomplished in various ways. In some embodiments, analog comparator circuitry may be used to compare individual temperature readings to temperature thresholds. Embodiments in which comparator circuit 214 implements processing circuitry capable of carrying out, in software, the comparison and calculation functions of comparator circuit 214 are also possible and contemplated.

Based on the comparisons, comparator circuit 214 may generate various signals that are provided to gear select circuit 212. In the embodiment shown, comparator circuit 214 may generate the Gear Up signal when comparisons indicate that temperature data indicates a temperature exceeding a Gear Up threshold. Similarly, if temperature data indicates a temperature below the Gear Dn threshold, comparator circuit 214 may generate the Gear Dn signal. If the temperature exceeds a first warning temperature, a signal T_warn0 may be asserted. If the temperature exceeds a second temperature (greater than the first), a signal T_warn1 may be asserted.

Gear select circuit 212 in the embodiment shown is coupled to receive the signals generated by comparator circuit 214 and a demand current signal, I_demand. Using the information in these signals/indications, gear select circuit 212 may determine the number of phase circuits to be active and generate a corresponding gear code. Per the discussion above, this may include generating a gear code for a full gear or a partial gear.

In response to assertion of the Gear Up signal, gear select circuit 212 may generate a gear code that indicates that additional phase circuits are to be activated in accordance with moving to the next higher gear. If the Gear Dn signal is asserted, gear select circuit 212 may generate a gear code that indicates that some currently active phase circuits are to be deactivated. If the T_warn0 signal is asserted, gear select circuit 212 in the embodiment shown generates a gear code that causes activation of a preset number of additional phase circuits over some minimum number of active phases (this may include activating phase circuits to meet the minimum value). If the T_warn1 signal is asserted, indicating a temperature over some specified critical level, gear select circuit 212 may generate a gear code to cause all phase circuits to be activated. The T_warn0 and T_warn1 signals may be generated in other portions of the system (not shown here) using temperature comparators that compare received temperatures from various ones of the temperatures sensors (in the phase circuits) to various thresholds, including the T_warn0 and T_warn1 thresholds.

The gear code is provided to both comparator circuit 214 and enable signal generator 216. As noted above, comparator circuit 214 uses the gear code to determine which thresholds are to be used as the basis for comparisons with received temperature readings. Enable signal generator 216 uses the gear code to generate enable signals that are provided to the individual phase circuits to cause their activation. Thus, in response to an indication that a current gear is to be changed gear select circuit 212 is configured to change the gear code. As noted above, some embodiments may enable the use of partial gears, e.g., when the number of active phase circuits is to be changed for the purposes of regulation without changing the gear due to temperature considerations.

Figure 3A:
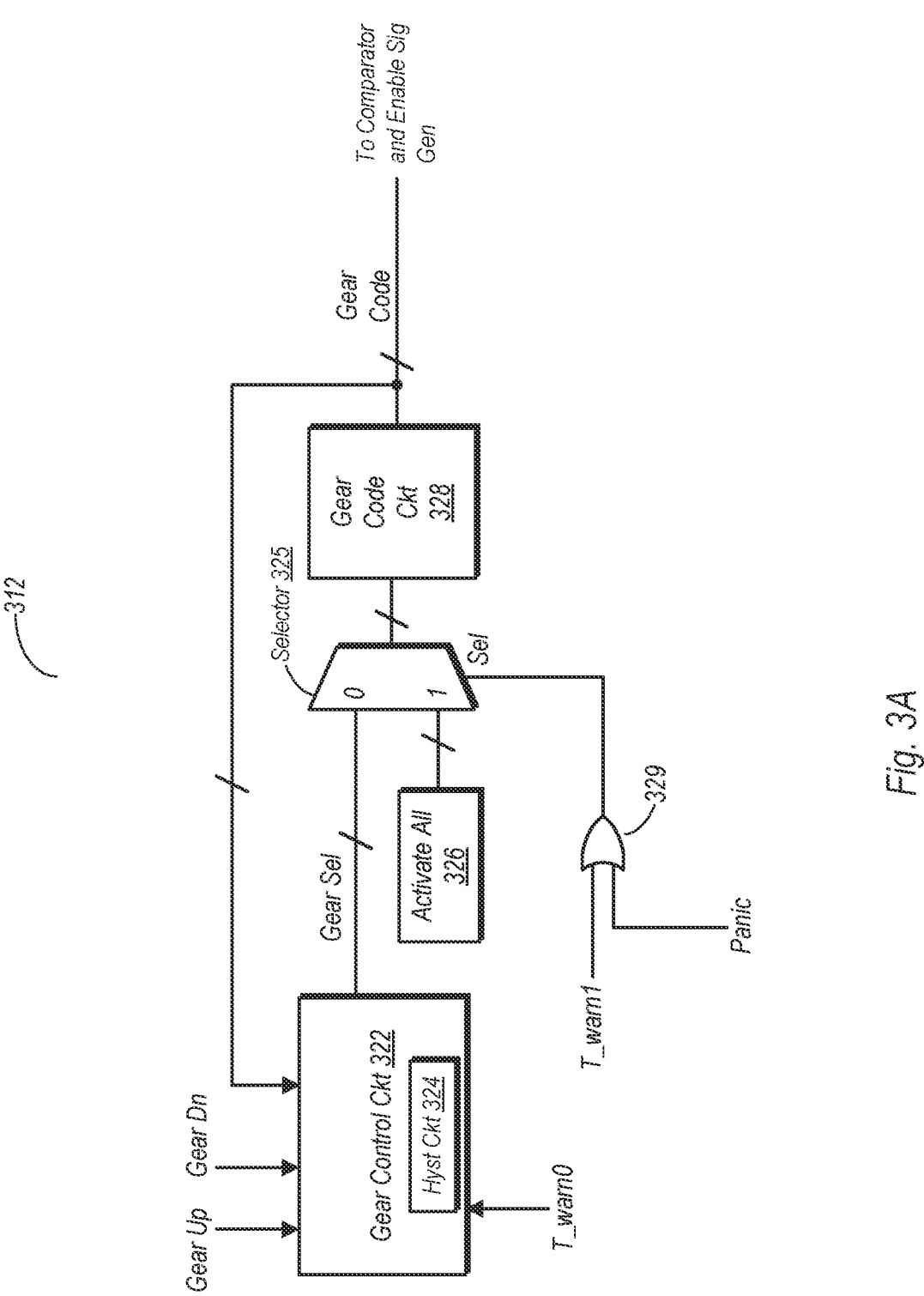
FIG. 3A is a block diagram of a gear select circuit used in one embodiment of a power converter control circuit.

FIG. 3A is a block diagram of one embodiment of a gear select circuit. In the embodiment shown, gear select circuit 212 is discussed in terms of selecting a gear based on thermal considerations from comparisons of temperature readings with various temperature thresholds. Although not explicitly discussed here, gear select circuit 312 may include additional functionality that is used to cause changes to the number of active phase circuits in a power converter for considerations such as regulation and demand current when there are no other thermal considerations that would otherwise cause such a change.

In the embodiment shown, gear control circuit 322 is configured to receive the Gear Up, Gear Dn, and T_warn0 signals from, e.g., an embodiment of comparator circuit 214 of FIG. 2. Additionally, gear control circuit 322 is configured to receive the gear code generated by gear code circuit 328. A hysteresis circuit 324 is included in this embodiment of gear control circuit 322 to prevent oscillating between different gears. For example, hysteresis circuit 324 in one embodiment may implement a timer that begins tolling after the gear has been moved to a higher gear such that the power converter will operate in that gear for a minimum amount of time before moving down to a lower gear.

In response to receiving the Gear Up or Gear Dn signals, gear control circuit 322 may generate gear select signals (Gear Sel) that cause a change to the next higher or next lower gear, respectively, from the present gear as indicated by the received gear code. In the event that the T_warn0 signal is received, gear control circuit 322 may generate gear select signals to raise the value of the minimum gear from the lowest possible gear to a value of the current gear plus a delta of one or more additional gears. This minimum gear may be maintained until de-assertion of the T_warn0 signal.

The gear select signals output by gear control circuit 322 in the embodiment shown are conveyed to a selector circuit 325. The signals are passed through selector 325, whenever the 0 value is input to the select input, to gear code circuit 328. Using the gear select circuit, gear code circuit 328 generates a gear code that is conveyed to both comparator circuitry and enable select circuitry (which may be implemented using one of the various embodiments discussed elsewhere herein).

Gear select circuit 312 also includes an OR gate 329, which is coupled to receive the T_warn1 signal and the panic signal. The T_warn1 signal is indicative of high temperature alarm, and when asserted, causes OR gate 329 to select the '1' input of selector 325. Similarly, the Panic signal is an alarm that indicates a condition that needs immediate attention, such as an excessive demand current, and also causes the selection of the '1' input of selector 325. When the '1' input of selector 325 is asserted, an activate all signal 326 is pass through to gear code circuit 328. In response to receiving this signal, gear code circuit 328 in the embodiment shown generates a gear code to cause activation of all phase circuits, irrespective of the gear in which the power converter was operating prior thereto. In the case that all phase circuits are activated in response to assertion of the T_warn1 signal, current may be redistributed among the phases to reduce the $I^2R$ losses, and thus thermal output. In the case that the all phase circuits are activated due to the assertion of Panic signal, extra current may be provided to meet demands of the load and to prevent or minimize a voltage droop. The Panic signal may be generated elsewhere in the system, e.g., in a power management circuit or other location that includes circuitry configured to detect its assertion.

Figure 3B:
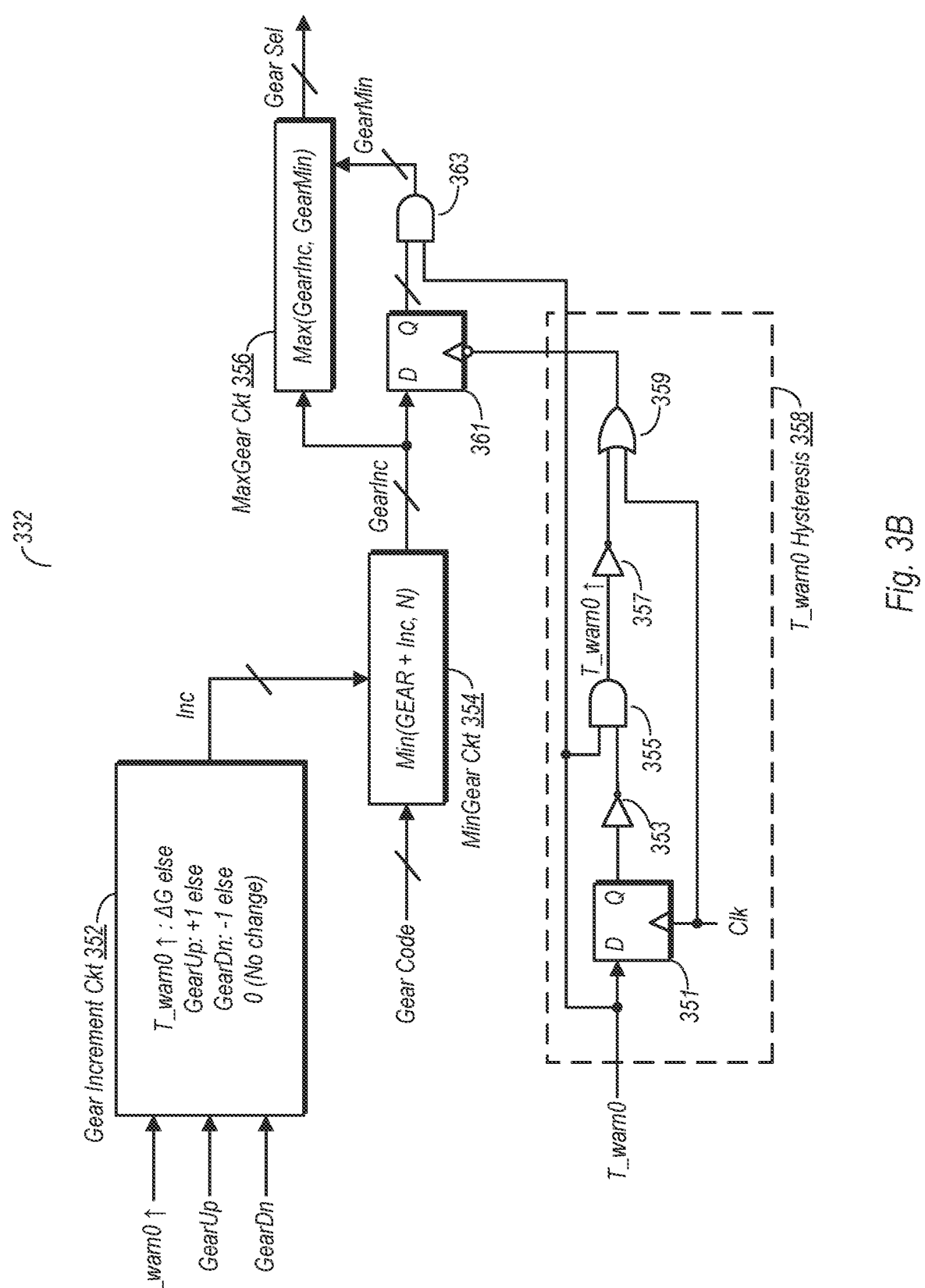
FIG. 3B is a block diagram of one embodiment of a gear control circuit used in another embodiment of the gear select circuit of FIG. 3A.

FIG. 3B is a diagram illustrating an embodiment of a gear select circuit that may be used in the gear control circuit of FIG. 3A. In the embodiment shown, gear select circuit 332 includes a gear increment circuit 352, a minimum gear circuit 354, and a maximum gear circuit 356, and a T_warn0 hysteresis circuit 358 (hereinafter hysteresis circuit 358). This embodiment may control the selected gear with additional pressure from temperature readings. It is noted that the various signals portrayed in FIG. 3, such as Inc, GearInc, GearMin, etc., may be multi-bit signals, as indicated.

Gear increment circuit 352 in the embodiment shown is coupled to receive the GearUp and GearDn signals generated by a comparator circuit, such as comparator 214 of FIG. 2. Additionally, gear increment circuit 352 in the embodiment shown is also coupled to receive the T_warn0 asserted (signal, which is generated in T_warn0 hysteresis circuit 358 as described below. When the T_warn0↑ signal is received by gear increment circuit, it may generate an increment signal (Inc) that cause an increase in the gear, from the current value, by a value ΔG, which may be two or more gears. If the T_warn0↑ is not received/asserted, but the GearUp signal is asserted, then gear increment circuit may cause the increment signal to indicate that the gear it to be incremented by one. If neither the T_warn0↑ nor GearUp signal is asserted, but the GearDn signal is asserted, then gear increment circuit 352 may indicate, through the Inc signal, that the gear is to be decremented by one. If none of these signals are asserted, the Inc signal may indicate that the gear is to remain at its current value.

The minimum gear circuit 354 in the embodiment shown is coupled to receive the current gear code to determine a minimum gear based on the current gear as well as the value of the increment signal or value of N (total number of gears). In the case where gear increment circuit 352 outputs a value indicating no change to the current gear, the minimum gear is the current value, while the value of the minimum gear is one value lower if the Inc signal indicates to decrement the gear. Otherwise, the minimum gear is determined to increase based on one of the GearUp or T_warn0↑ signals causing a corresponding change to the Inc signal. When T_warn0↑ is asserted, the minimum gear set by minimum gear circuit 354 may be the current gear plus ΔG, and this value may be maintained until T_warn0 is de-asserted (thus causing a corresponding de-assertion of T_warn0↑).

The GearInc signal is received by the MaxGear circuit 356 in the embodiment shown. The maximum gear circuit determines a gear and generates a corresponding gear selection signal, GearSel, based on the GearInc and GearMin signals.

Hysteresis circuit 358 in the embodiment shown may prevent oscillation between gears when the T_warn0 signal is momentarily or sporadically asserted. When T_warn0 is asserted flip-flop 351 may output a corresponding logic value in accordance with the clock signal, which is inverted and then provided to an input of AND gate 355. The T_warn0 signal is also applied directly to the other input of AND gate 355. Due to the propagation delay through flip-flop 351 and inverter 353, an assertion of T_warn0 may result in effectively immediate assertion of T_warn0.

GearInc may propagate through multi-bit flip-flop 361 in response to toggling on its clock input (which is active low in this embodiment). The active low clock input of multi-bit flip-flop 361 in the embodiment shown is coupled to the output of OR gate 359, which receives both a clock signal (Clk) as well as the output of inverter 357, which inverts the current state of T_warn0↑. Accordingly, the clock input of multi-bit flip-flop 361 in the embodiment shown may toggle in accordance with either the clock signal itself or a changing of the state of the T_warn0 signal (and thus T_warn0↑).

Multi-bit flip-flop 361 in the embodiment shown may allow the GearInc signal to be conveyed to multi-bit AND gate 363, to be ANDed with the T_warn0 signal. In this manner, the minimum gear value, or GearMin, may be set. When T_warn0 is asserted, the minimum gear may be set to the current gear plus ΔG. This minimum gear value may be maintained until T_warn0 is de-asserted. When T_warn0 is de-asserted, the output from multi-bit flip-flop 361 is inhibited from propagating through multi-bit AND gate 363, thus causing the GearMin signal to be all zeros.

Figure 4:
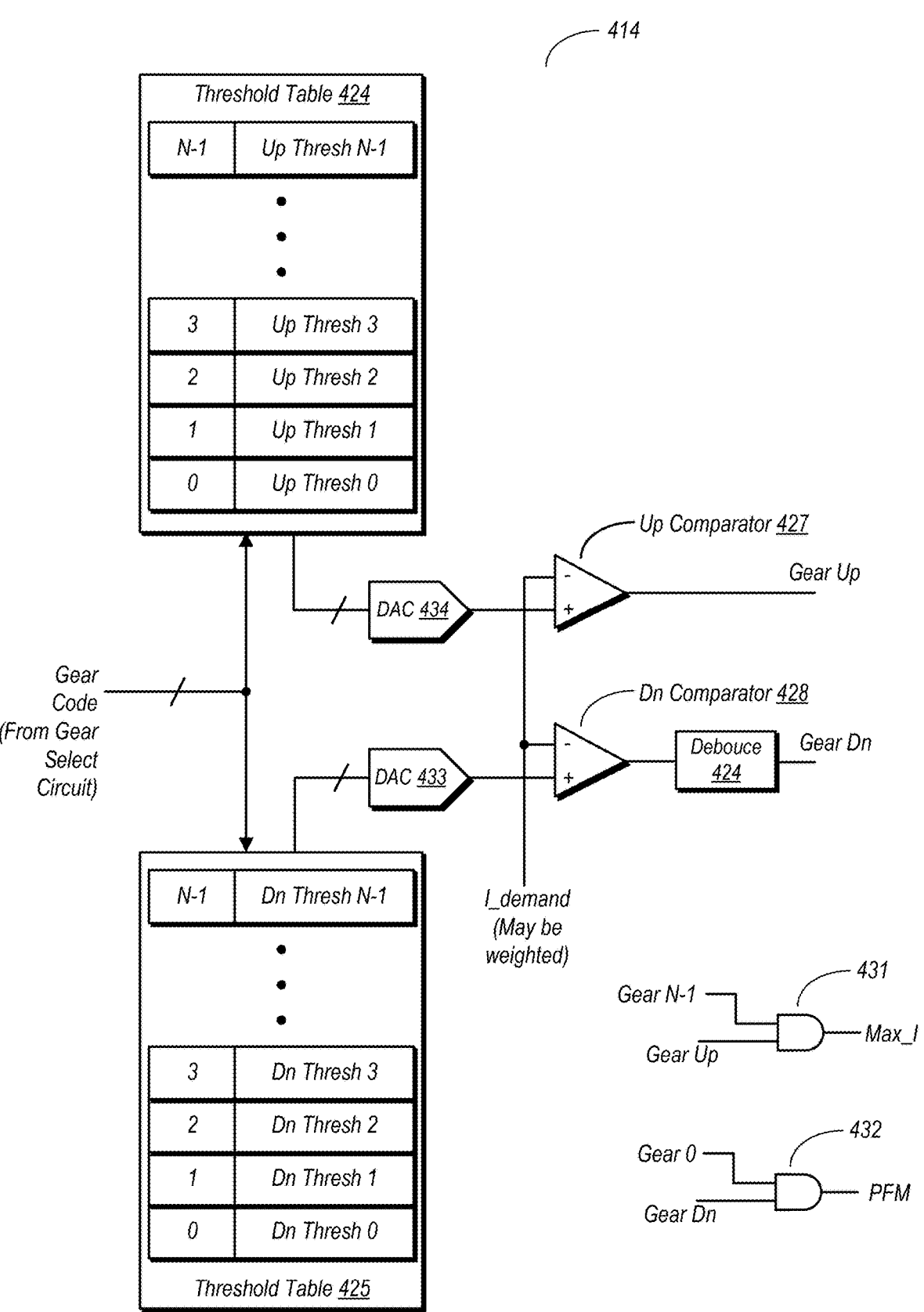
FIG. 4 is a block diagram of one embodiment of a comparator used in an embodiment of a power converter.

FIG. 4 is a block diagram of one embodiment of a comparator circuit 414. In the embodiment shown comparator 414 is configured to generate various signals to allow a gear select circuit (e.g., gear select circuit 212 of FIG. 2) to select a gear in which the power converter of the present disclosure is to operate.

Threshold tables 424 and 425 are coupled to receive a gear code from a gear select circuit. The gear code indicates the current gear in which the power converter is operating. Threshold table 424 in the embodiment shown stores up thresholds for the various gears. Each up threshold stored in threshold table 424 indicates a demand current threshold that, when exceeded during operation in its corresponding gear, may cause an increase the number of active phase circuits to the next higher gear. Each down threshold stored in threshold table 425 indicates a demand current threshold which, if a demand current falls below, may cause a decrease to the number of active phase circuits. Thus, for a particular instance of a comparison, the thresholds used are based on the current gear, or number of phase circuits, that are currently active.

In response to receiving a particular gear code, threshold table 424 provides an up threshold to digital-to-analog converter (DAC), which generates a corresponding analog signal provided to up comparator 427. Similarly, threshold table 425 in the embodiment shown provides a down threshold, corresponding to the received gear code, to DAC 422, which generate a corresponding analog signal provided to down comparator 428. Up comparator 427 compares the output of DAC 434 to a demand current signal, and generates the Gear Up signal if the signal value exceeds the threshold value. Otherwise, the Gear Up signal is not asserted. Similarly, the demand current signal is compared to the output of DAC 433. If the demand current as indicated is less than the threshold value, down comparator 428 asserts the Gear Dn signal, which passes through a debounce circuit before being finally output from comparator circuit 414. It is noted that embodiments are possible and contemplated in which the I_demand signal is received in digital form, and thus comparisons are carried out in the digital domain rather than in the analog domain as shown here.

Comparator circuit 414 also includes a pair of AND gates to trigger additional conditions. If operating in the top gear, gear N−1 in this embodiment, and the Gear Up signal is asserted, AND gate 431 asserts the Max_I signal. This signal may be provided to, e.g., a power management circuit to indicate that the power converter is providing the maximum amount of current for which regulation may be maintained, and that additional actions may be required. Such actions may include clock gating of the load circuit for some amount of time or reducing the operating voltage.

AND gate 432 in the embodiment shown is configured to perform an AND function on the Gear 0 and Gear Dn signals. If the Gear Dn signal is asserted and the current gear is Gear 0 (the lowest gear), the PFM (pulse frequency modulation) signal is asserted. This signal may be provided to the control circuit of the power converter and/or a power management circuit. This may cause the power converter to change operating modes from a pulse width modulation mode (PWM) to a PFM mode to further reduce output current and save power.

Figure 5:
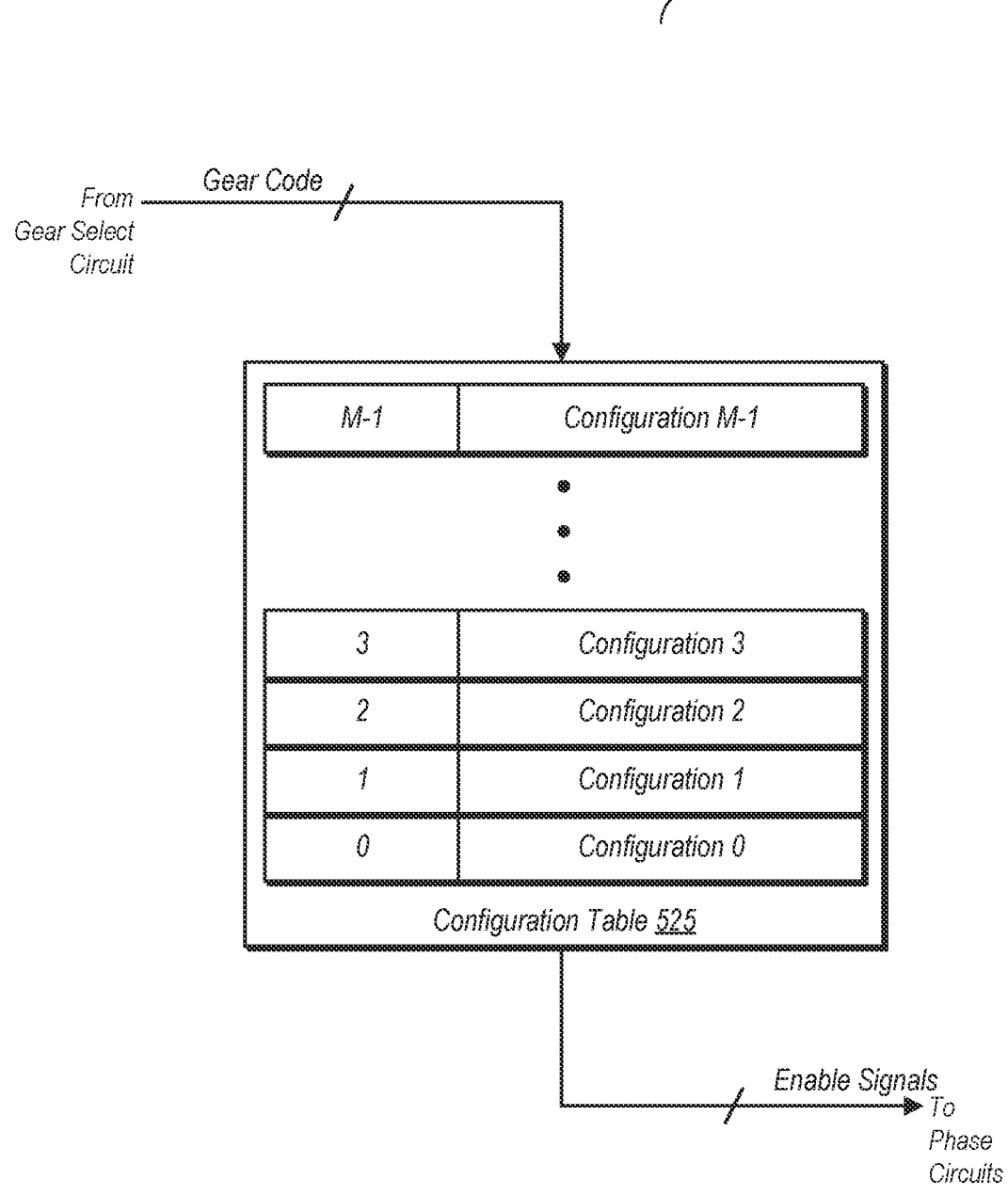
FIG. 5 is a block diagram of an embodiment of an enable signal generator used to activate and deactivate phase circuit of one embodiment of a power converter.

FIG. 5 is a block diagram of one embodiment of an enable signal generator. In the embodiment shown, the enable signal generator may include a configuration table storing a number of configurations of phase circuits that may be activated. The configurations may correspond to gears, although additional configurations to account for partial gears to allow for adjusting the number of active phases for reasons other than thermal considerations. In the embodiment shown, there are M configurations. The gear code, received from a gear select circuit, is used to select a particular configuration. In accordance with the selected configuration, a combination of enable signals may be asserted. These enable signals are provided to individual phase circuits. The asserted enable signals may cause activation of their corresponding phase circuits.

Figure 6:
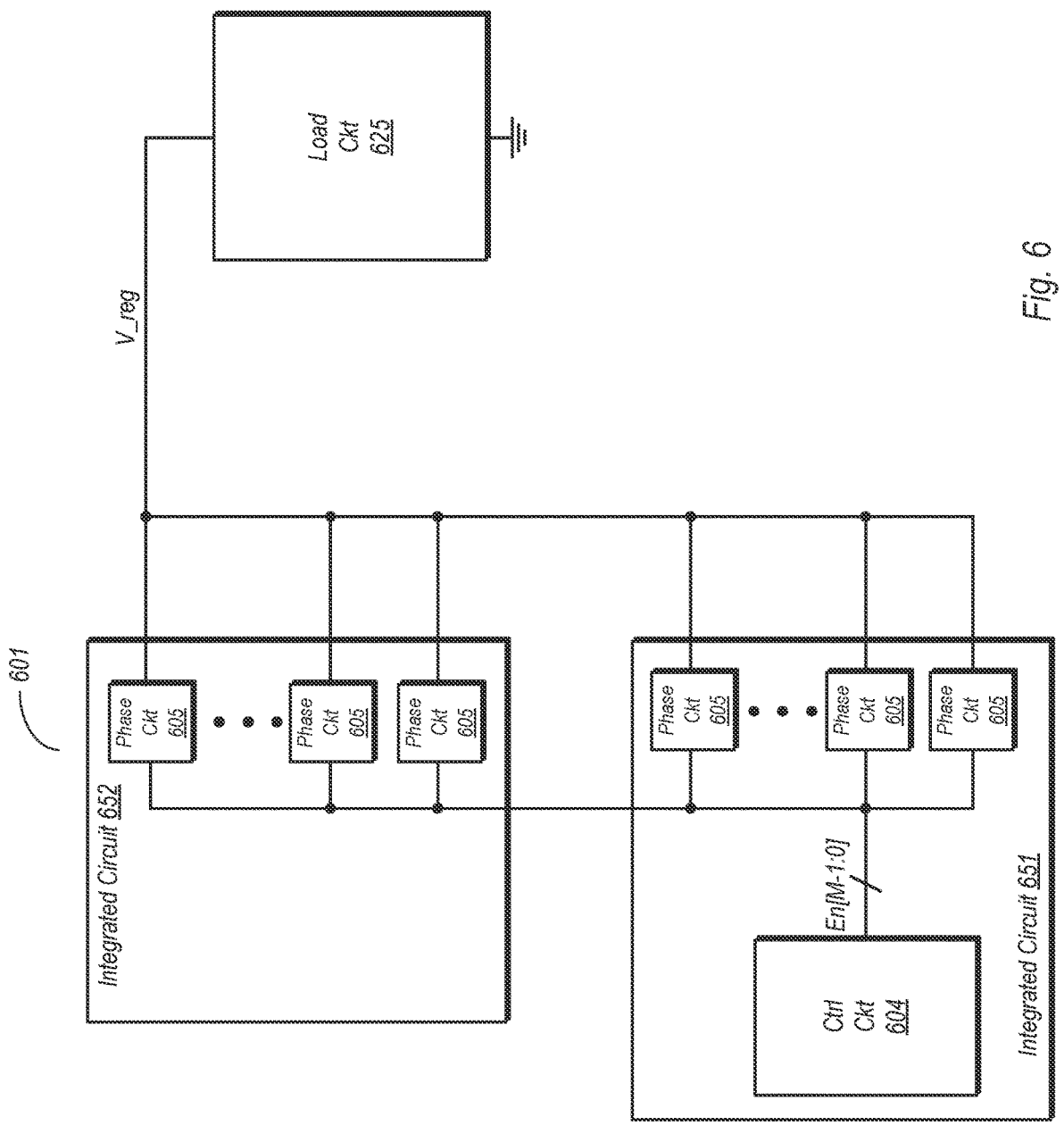
FIG. 6 is a block diagram of one embodiment of a power converter implemented on multiple integrated circuit die.

FIG. 6 is a block diagram of one embodiment of a power converters and a load circuit, with the power converter being implemented on two different integrated circuits (ICs). In the embodiment shown, power converter 601 is implemented on IC 651 and IC 652. IC 651 includes a control circuit 604 as well as a number of phase circuits. Additional phase circuits 605 are implemented on IC 652. The phase circuits of ICs 651 and 652 are configured to combine to generate a regulated supply voltage, V_reg, which is provided to a load circuit 625. Control circuit 604 may enable and disable the various ones of the phase circuits 605 on both IC 651 and IC 652. It is noted that the number of phase circuits on IC 651 and IC 652 may be different from one another, although embodiments in which the number of phase circuits are the same are also possible and contemplated. Furthermore, in some embodiments, the phase circuits 605 may be identical on both IC 651 and IC 652. However, embodiments in which at least some phase circuit 605 are different from others are also possible and contemplated.

Methods of Operation:

FIG. 7 is a flow diagram illustrating one embodiment of a method for operating a multi-phase power converter according to the disclosure. Method 700 may be carried out by any of the various embodiments of a power converter as discussed above in reference to FIGS. 1-6. Power converter embodiments capable of carrying out Method 700, but not explicitly discussed herein, are also considered to fall within the scope of this disclosure.

Method 700 includes providing a demand current, using a power converter having a plurality of phases, to a load circuit (block 705) and activating selected ones of the plurality of phases, using a control circuit, based on the demand current (block 710). The method further includes generating temperature readings using a plurality of temperature sensors distributed among the plurality of phases (block 715) and increasing a number of active ones of the plurality of phases, using the control circuit, in response to receiving a temperature reading from one of the temperature sensors that exceeds a first temperature threshold (block 720).

In various embodiments, increasing a number of active ones of the plurality of phases in response to receiving a temperature reading from one of the temperature sensors that exceeds a first temperature threshold comprises doubling, using the control circuit, the number of active ones of the plurality of phases. Some embodiments of the method may include activating all of the plurality of phases, using the control circuit, in response to receiving a temperature reading that exceeds a second temperature threshold, wherein the second temperature threshold is greater than the first temperature threshold.

In various embodiments, the method may include comparing, using comparison circuitry, temperature readings received from ones of the plurality of temperature sensors to ones of a plurality of temperature thresholds. Such embodiments may also include increasing the number of active ones of the plurality of phases, using the control circuit, by a factor of two in response to a given temperature reading exceeding a particular one of the plurality of temperature thresholds. Additionally, such embodiments may also include activating a first subset of the plurality of phases, using the control circuit, in response to receiving a first given temperature reading greater than a first one of the plurality of temperature thresholds but less than a second one of the plurality of temperature thresholds; and activating a second subset of the plurality of phases, using the control circuit, in response to receiving a second temperature reading greater than the second one of the plurality of temperature thresholds. In such embodiments, the second one of the plurality of temperature thresholds is greater than the first one of the plurality of temperature thresholds, while a number of phases of the second subset is greater than a number of phases of the first subset.

Figure 8:
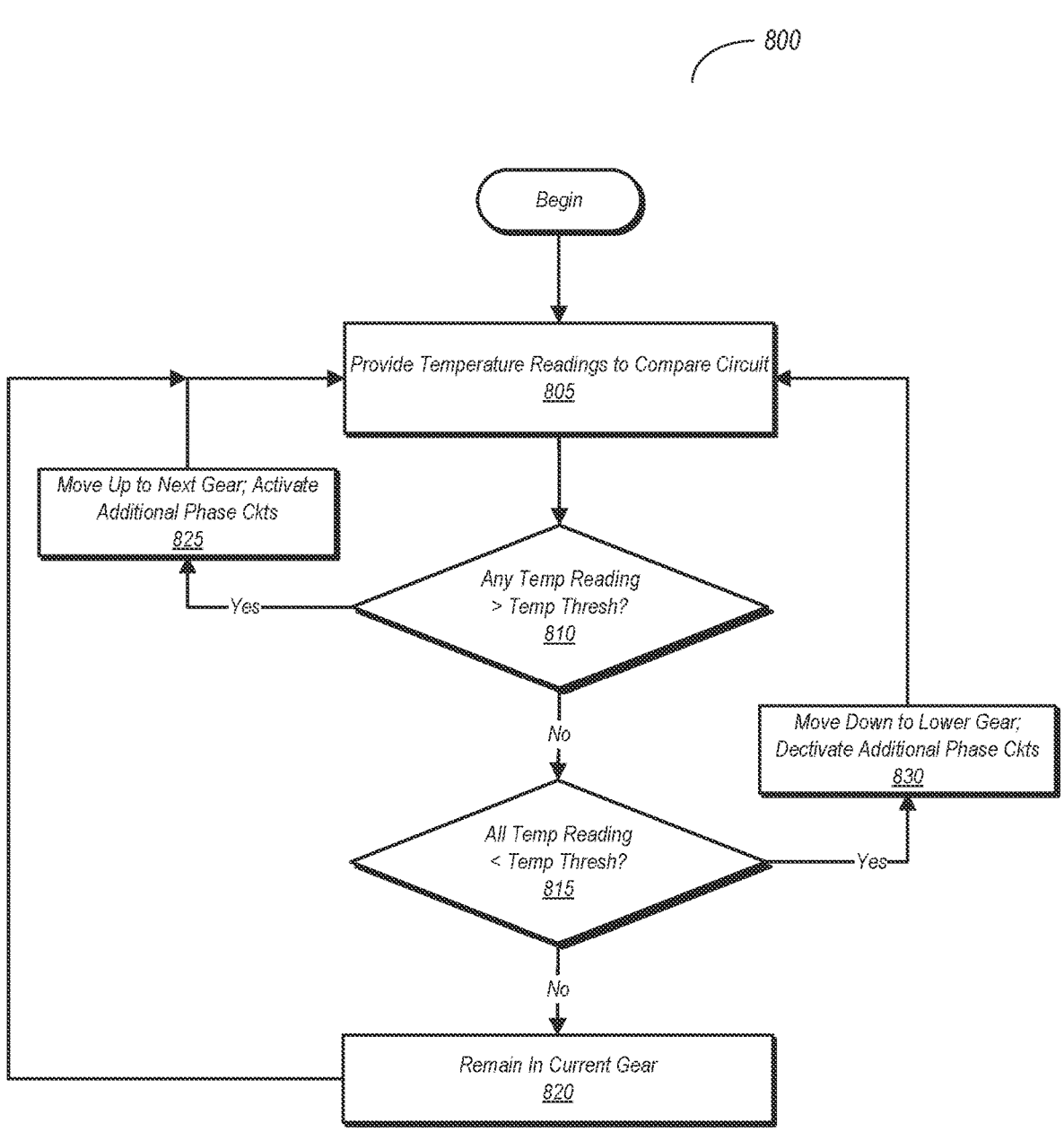
FIG. 8 is a flow diagram of another embodiment of a method for operating a power converter.

FIG. 8 is a flow diagram of another embodiment of a method for operating a multi-phase power converter according to the disclosure. Method 800 may be carried out by various power converter embodiments in accordance with those discussed above. Furthermore, embodiments of a power converter capable of carrying out Method 800, but not otherwise disclosed herein, are also considered to fall within the scope of this disclosure.

Method 800 includes providing temperature readings to a compare circuit (block 805). In various embodiments of a multi-phase power converter, temperature sensors may be located in close, physical proximity to various ones of the phase circuits such that the operating temperature of these circuits can be measured. The readings may be provided to the compare circuit by various mechanisms, a telemetry bus being one possible example.

The comparator circuitry may compare the received temperature readings against various thresholds. In the embodiment shown, the temperature thresholds used for comparison are based on a number of phase circuits currently active, also defined herein as a gear. More particularly, the comparisons in this particular embodiment are performed against a gear up threshold and a gear down thresholds. A gear up threshold is defined herein as one that, if exceeded by one or more temperature readings, would cause activation of additional phase circuits, which is also referred to herein as moving up to the next gear. A gear down threshold is one that, in this particular embodiment, would cause deactivation of one or more currently active phase circuits, or moving down a gear. The gear up and gear down thresholds used as a basis of comparison at any given time are based on the current gear in this embodiment. It is noted that, in some cases, a gear down threshold for a given gear may correspond to a gear up threshold for the next gear down. However, these two thresholds may be different in some embodiments in order to, e.g., prevent oscillation between the gears.

If, in comparing currently received temperature readings against a particular temperature threshold, one or more reading exceeds this value (block 810, yes), the power converter carrying out Method 800 moves to the next gear up by activating additional phase circuits (block 825), with the method returning to block 805. The number of additional phase circuits activated may vary from one embodiment to the next. In one embodiment, the number of active phase circuits may be doubled, thereby reducing $I^2R$ losses in the individual, active phase circuits to one fourth of their previous value. However, embodiments are possible and contemplated in which the number of additional phase circuits activated may be different, with as few as one additional phase circuit being activated.

If, in this embodiment, none of the temperature readings exceeds the temperature threshold (block 810, no), but each of the received readings is less than the another temperature threshold (block 815, yes), the power converter carrying out Method 800 may move down to the next lower gear (block 835) by deactivating one or more of the currently active phase circuits, then proceeding to block 805. The temperature threshold used as a basis for comparison in block 815 may be less than that used in block 810. The number of phase circuits deactivated may vary from one embodiment to another. In one embodiment, the number of phase circuits deactivated may be half of the currently active phase circuits. However, embodiments are possible and contemplated where any suitable number or factor may be utilized in determining the number of phase circuits to be deactivated when moving to the next lower gear. It is further noted, even though not shown in FIG. 8, that debounce timers or other hysteresis mechanisms may be implemented in conjunction with blocks 815 and 830 to prevent oscillation between two adjacent gears.

If no temp reading exceeds the particular temperature threshold (block 810, no) and at not all temp readings fall below the other temperature threshold (block 815, no), then the power converter carrying out Method 800 may remain in the current gear (block 820), with the method returning to block 805.

Variations of the methods discussed above are possible and contemplated. For example, embodiments in which the received temperature readings are averaged are possible and contemplated, with a decision whether to change the current gear being based on this average. Thus, in one embodiment, if an average temperature, when rounded up would meet the gear up threshold, the corresponding power converter may activate additional phases as if the gear up threshold has been exceeded. Numerous other variations are possible and contemplated to allow the power converter to redistribute demand current among a plurality of phase circuits for the purposes of thermal mitigation.

Example Device

Figure 9:
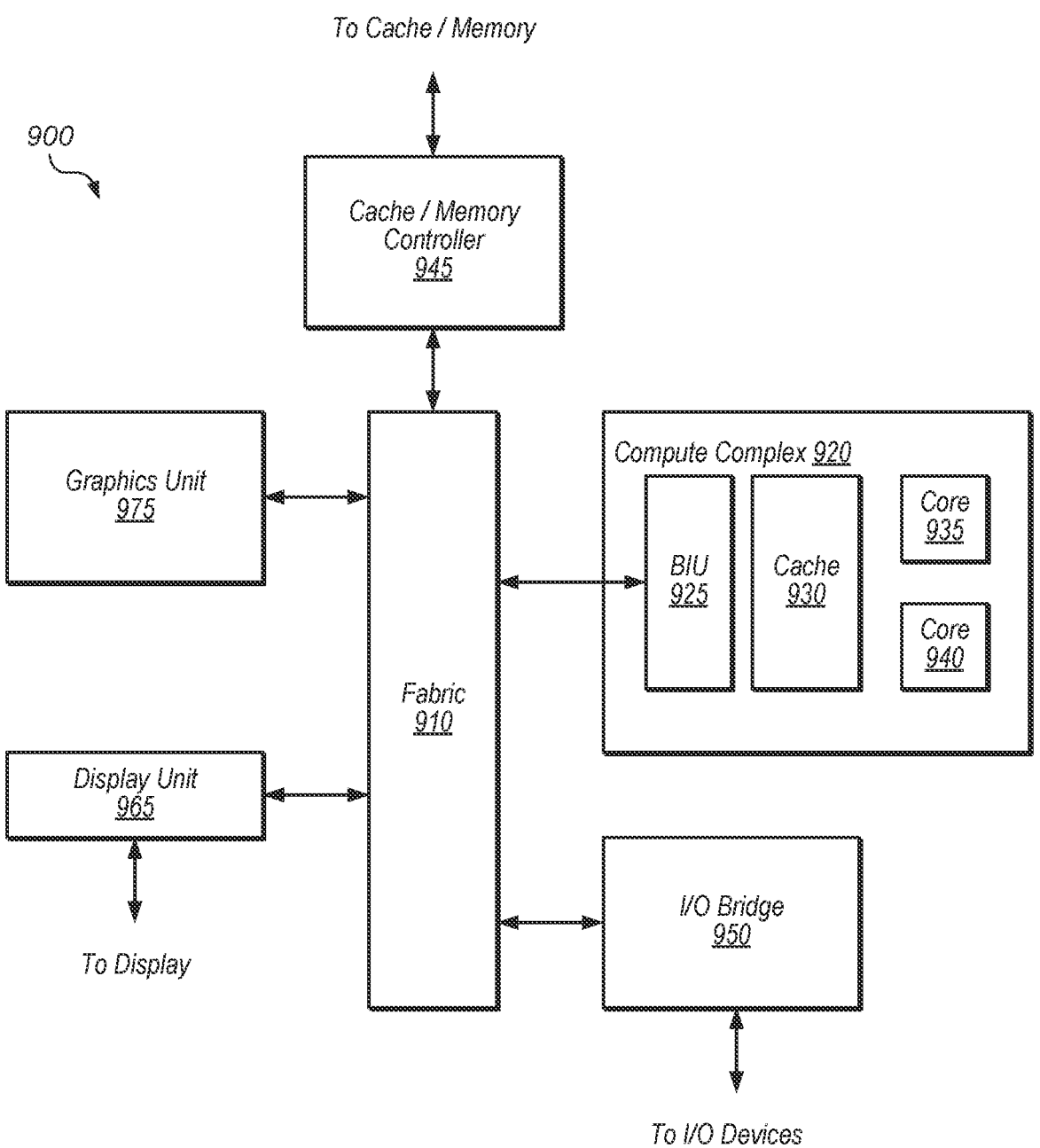
FIG. 9 is a block diagram of one embodiment of an example device which may implement a memory controller according to the disclosure.

Referring now to FIG. 9, a block diagram illustrating an example embodiment of a device 900 is shown. In some embodiments, elements of device 900 may be included within a system on a chip. In some embodiments, device 900 may be included in a mobile device, which may be battery-powered. Therefore, power consumption by device 900 may be an important design consideration. In the illustrated embodiment, device 900 includes fabric 910, compute complex 920 input/output (I/O) bridge 950, cache/memory controller 945, graphics unit 975, and display unit 965. In some embodiments, device 900 may include other components (not shown) in addition to or in place of the illustrated components, such as video processor encoders and decoders, image processing or recognition elements, computer vision elements, etc.

Fabric 910 may include various interconnects, buses, MUX's, controllers, etc., and may be configured to facilitate communication between various elements of device 900. In some embodiments, portions of fabric 910 may be configured to implement various different communication protocols. In other embodiments, fabric 910 may implement a single communication protocol and elements coupled to fabric 910 may convert from the single communication protocol to other communication protocols internally.

In the illustrated embodiment, compute complex 920 includes bus interface unit (BIU) 925, cache 930, and cores 935 and 940. In various embodiments, compute complex 920 may include various numbers of processors, processor cores and caches. For example, compute complex 920 may include 1, 2, or 4 processor cores, or any other suitable number. In one embodiment, cache 930 is a set associative L2 cache. In some embodiments, cores 935 and 940 may include internal instruction and data caches. In some embodiments, a coherency unit (not shown) in fabric 910, cache 930, or elsewhere in device 900 may be configured to maintain coherency between various caches of device 900. BIU 925 may be configured to manage communication between compute complex 920 and other elements of device 900. Processor cores such as cores 935 and 940 may be configured to execute instructions of a particular instruction set architecture (ISA) which may include operating system instructions and user application instructions. These instructions may be stored in computer readable medium such as a memory coupled to memory controller 945 discussed below.

As used herein, the term "coupled to" may indicate one or more connections between elements, and a coupling may include intervening elements. For example, in FIG. 9, graphics unit 975 may be described as "coupled to" a memory through fabric 910 and cache/memory controller 945. In contrast, in the illustrated embodiment of FIG. 9, graphics unit 975 is "directly coupled" to fabric 910 because there are no intervening elements.

Cache/memory controller 945 may be configured to manage transfer of data between fabric 910 and one or more caches and memories. For example, cache/memory controller 945 may be coupled to an L3 cache, which may in turn be coupled to a system memory. In other embodiments, cache/memory controller 945 may be directly coupled to a memory. In some embodiments, cache/memory controller 945 may include one or more internal caches. Memory coupled to controller 945 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 945 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 920 to cause the computing device to perform functionality described herein.

Graphics unit 975 may include one or more processors, e.g., one or more graphics processing units (GPUs). Graphics unit 975 may receive graphics-oriented instructions, such as OPENGL®, Metal®, or DIRECT3D® instructions, for example. Graphics unit 975 may execute specialized GPU instructions or perform other operations based on the received graphics-oriented instructions. Graphics unit 975 may generally be configured to process large blocks of data in parallel and may build images in a frame buffer for output to a display, which may be included in the device or may be a separate device. Graphics unit 975 may include transform, lighting, triangle, and rendering engines in one or more graphics processing pipelines. Graphics unit 975 may output pixel information for display images. Graphics unit 975, in various embodiments, may include programmable shader circuitry which may include highly parallel execution cores configured to execute graphics programs, which may include pixel tasks, vertex tasks, and compute tasks (which may or may not be graphics-related).

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display).

I/O bridge 950 may include various elements configured to implement: universal serial bus (USB) communications, security, audio, and low-power always-on functionality, for example. I/O bridge 950 may also include interfaces such as pulse-width modulation (PWM), general-purpose input/output (GPIO), serial peripheral interface (SPI), and inter-integrated circuit (I2C), for example. Various types of peripherals and devices may be coupled to device 900 via I/O bridge 950.

In some embodiments, device 900 includes network interface circuitry (not explicitly shown), which may be connected to fabric 910 or I/O bridge 950. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 900 with connectivity to various types of other devices and networks.

Example Applications

Figure 10:
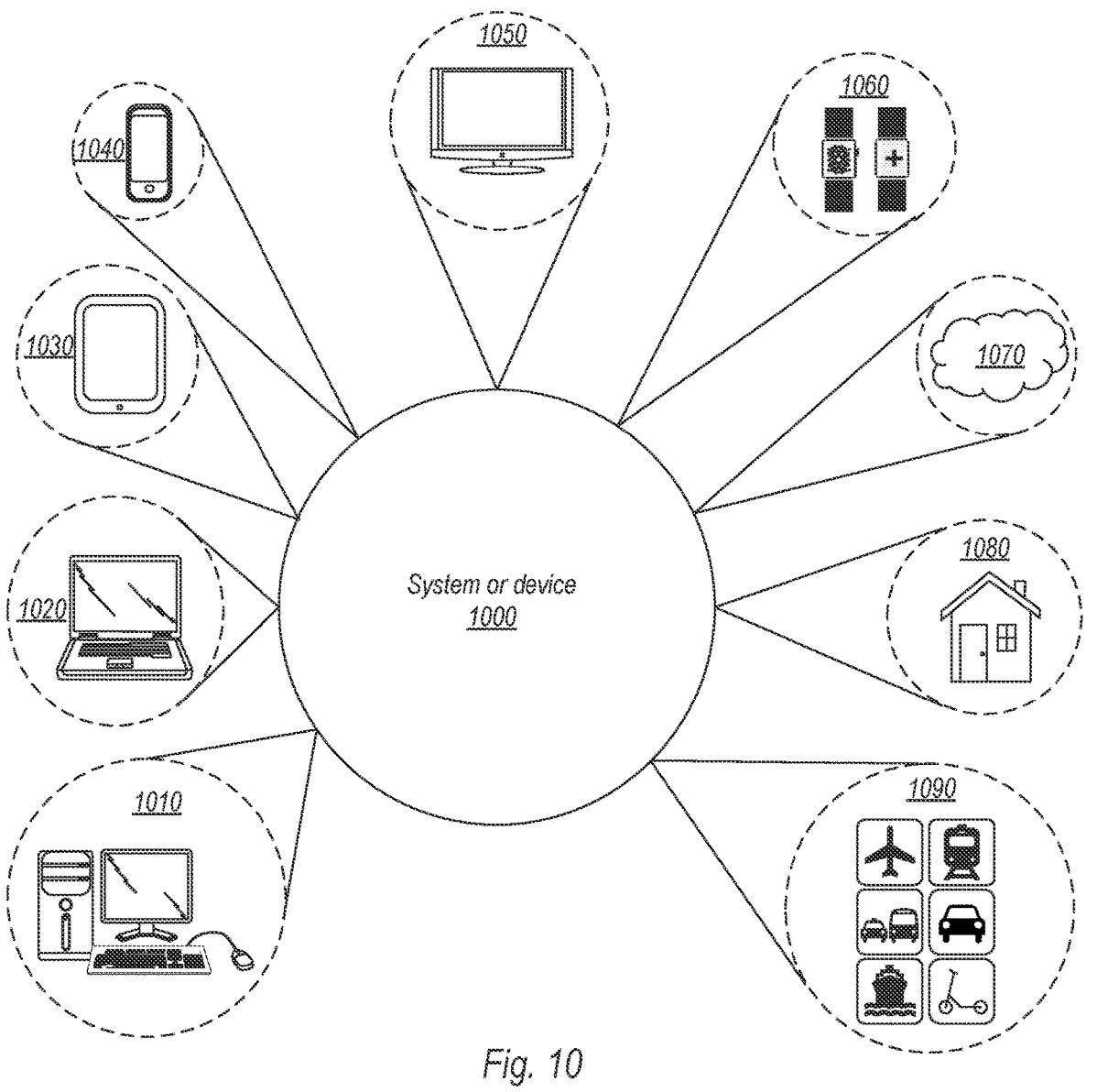
FIG. 10 is a block diagram illustrating example applications of an integrated circuit having a memory controller according to the disclosure.

Turning now to FIG. 10, various types of systems that may include any of the circuits, devices, or system discussed above. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc. The disclosure also contemplates applications including head-mounted devices, dual-display devices, other types of wearable devices not otherwise mentioned above, and various types of multimedia devices.

Various ones of the applications illustrated in FIG. 10 may include one or more multi-phase power converters. Such multi-phase power converters may carry out operations in accordance with the various embodiments discussed above, including performing thermal mitigation by activating additional phase circuits to reduce PR losses.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 11:
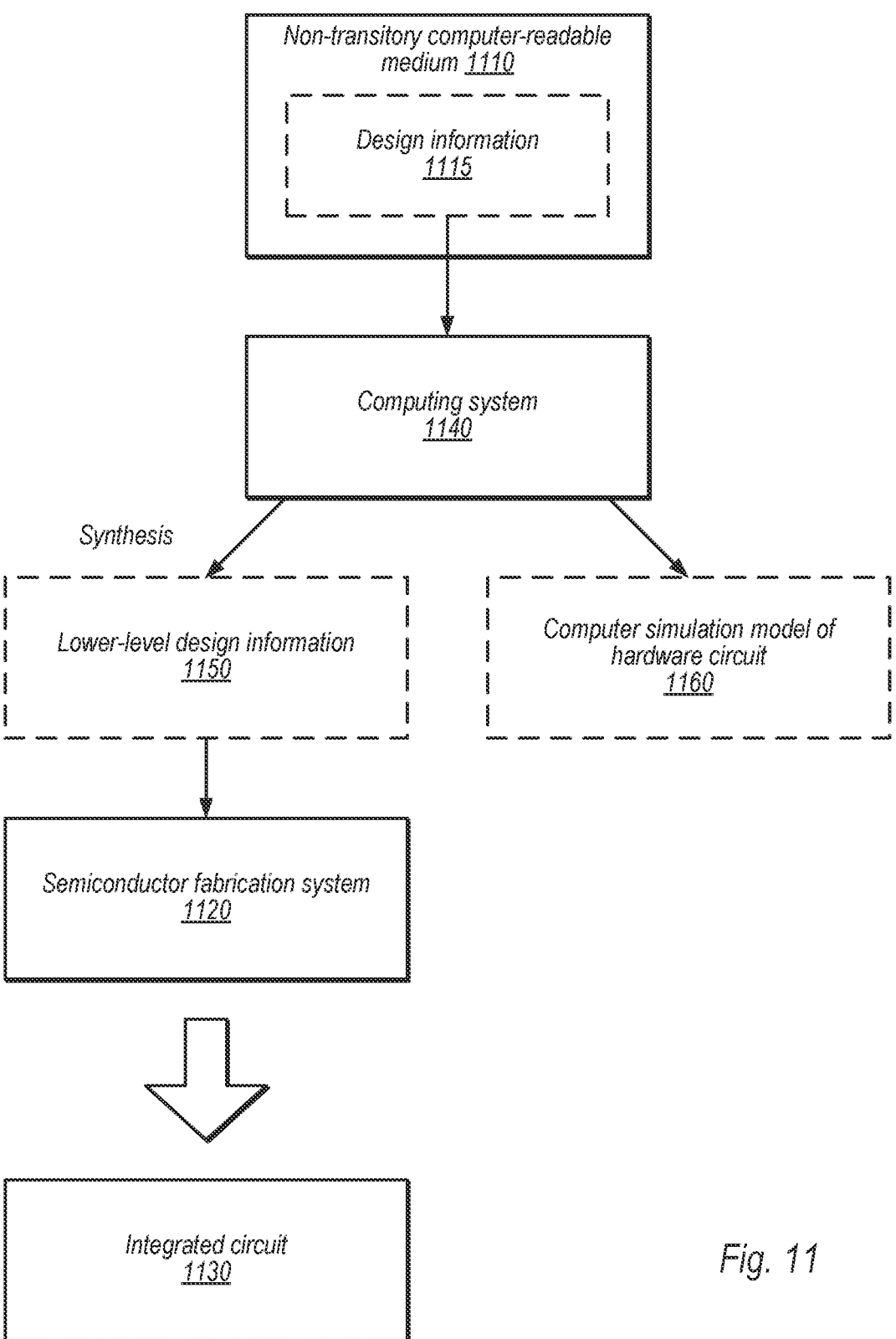
FIG. 11 is a block diagram of one embodiment of a computer readable medium and a manufacturing system capable of manufacturing a circuit including a memory controller according to the disclosure.

FIG. 11 is a block diagram illustrating an example non-transitory computer-readable storage medium that stores circuit design information, according to some embodiments. In the illustrated embodiment, computing system 1140 is configured to process the design information. This may include executing instructions included in the design information, interpreting instructions included in the design information, compiling, transforming, or otherwise updating the design information, etc. Therefore, the design information controls computing system 1140 (e.g., by programming computing system 1140) to perform various operations discussed below, in some embodiments.

In the illustrated example, computing system 1140 processes the design information to generate both a computer simulation model of a hardware circuit 1160 and lower-level design information 1150. In other embodiments, computing system 1140 may generate only one of these outputs, may generate other outputs based on the design information, or both. Regarding the computing simulation, computing system 1140 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1140 also processes the design information to generate lower-level design information 1150 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1150 (potentially among other inputs), semiconductor fabrication system 1120 is configured to fabricate an integrated circuit 1130 (which may correspond to functionality of the simulation model 1160). Note that computing system 1140 may generate different simulation models based on design information at various levels of description, including information 1150, 1115, and so on. The data representing design information 1150 and model 1160 may be stored on medium 1110 or on one or more other media.

In some embodiments, the lower-level design information 1150 controls (e.g., programs) the semiconductor fabrication system 1120 to fabricate the integrated circuit 1130. Thus, when processed by the fabrication system, the design information may program the fabrication system to fabricate a circuit that includes various circuitry disclosed herein.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Accordingly, non-transitory computer-readable storage medium 1110 may include two or more memory media; such media may reside in different locations—for example, in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1140, semiconductor fabrication system 1120, or both. In some embodiments, design information may also include one or more cell libraries that specify the synthesis, layout, or both of integrated circuit 1130. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1130 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 and model 1160 are configured to operate according to a circuit design specified by design information 1115, which may include performing any of the functionality described herein. For example, integrated circuit 1130 may include any of various elements shown in FIGS. 1-6, and may thus implement a multi-phase power converter. Further, integrated circuit 1130 may be configured to perform various functions described herein in conjunction with other components. Further, the functionality described herein may be performed by multiple connected integrated circuits, such as in the embodiment of FIG. 6.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1120 to fabricate integrated circuit 1130.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of U.S. patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a U.S. patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a power converter having a plurality of phase circuits configured to provide a demand current to a load circuit, wherein the power converter further includes a control circuit configured to activate selected ones of the plurality of phase circuits based on the demand current;
a plurality of temperature sensors distributed among the plurality of phase circuits; and
wherein the control circuit is configured to receive temperature readings from ones of the plurality of temperature sensors and further configured to increase a number of active ones of the plurality of phase circuits in response to receiving a temperature reading from one of the temperature sensors that exceeds a first temperature threshold; and
wherein the control circuit is configured to activate all of the plurality of phase circuits in response to receiving a temperature reading that exceeds a second temperature threshold, wherein the second temperature threshold is greater than the first temperature threshold.

2. The apparatus of claim 1, wherein the control circuit is configured to double a number of active ones of the plurality of phase circuits in response to receiving a temperature reading from one of the temperature sensors that exceeds the first temperature threshold.

3. The apparatus of claim 1, wherein the control circuit includes comparison circuitry configured to compare the temperature readings received from ones of the plurality of temperature sensors to ones of a plurality of temperature thresholds.

4. The apparatus of claim 3, wherein the control circuit is configured to:
activate a first subset of the plurality of phase circuits in response to receiving a first temperature reading greater than a first one of the plurality of temperature thresholds but less than a second one of the plurality of temperature thresholds; and
activate a second subset of the plurality of phase circuits in response to receiving a second temperature reading greater than the second one of the plurality of temperature thresholds;
wherein the second one of the plurality of temperature thresholds is greater than the first one of the plurality of temperature thresholds; and
wherein a number of phases of the second subset is greater than a number of phases of the first subset.

5. The apparatus of claim 3, wherein the control circuit is configured to increase the number of active ones of the plurality of phase circuits by a factor of two in response to a given temperature reading exceeding a particular one of the plurality of temperature thresholds.

6. The apparatus of claim 3, wherein the plurality of temperature thresholds includes a first subset and a second subset, and wherein temperature thresholds of the first subset are used by the control circuit to increase the number of active ones of the plurality of phase circuits, and wherein temperature thresholds of the second subset are used to decrease the number of active ones of the plurality of phase circuits.

7. The apparatus of claim 1, wherein the control circuit is further configured to, in response to receiving the temperature reading from one of the temperature sensors that exceeds a first warning temperature threshold, increase the number of active ones of the plurality of phase circuits by a minimum number of active phases plus a preset number of additional phases.

8. The apparatus of claim 1, wherein the control circuit includes a hysteresis circuit configured to delay changing the number of active ones of the plurality of phase circuits.

9. The apparatus of claim 1, wherein a first subset of the plurality of phase circuits are implemented on a first integrated circuit die, and wherein a second subset of the plurality of phase circuits are implemented on a second integrated circuit die.

10. A method comprising:
providing a demand current, using a power converter having a plurality of phase circuits, to a load circuit;
activating selected ones of the plurality of phase circuits, using a control circuit, based on the demand current;
generating temperature readings using a plurality of temperature sensors distributed among the plurality of phase circuits; and
increasing a number of active ones of the plurality of phase circuits, using the control circuit, in response to receiving a temperature reading from one of the temperature sensors that exceeds a first temperature threshold; and
activating all of the plurality of phase circuits, using the control circuit, in response to receiving a temperature reading that exceeds a second temperature threshold, wherein the second temperature threshold is greater than the first temperature threshold.

11. The method of claim 10, wherein increasing a number of active ones of the plurality of phase circuits in response to receiving a temperature reading from one of the temperature sensors that exceeds a first temperature threshold comprises doubling, using the control circuit, the number of active ones of the plurality of phase circuits.

12. The method of claim 10, further comprising comparing, using comparison circuitry, temperature readings received from ones of the plurality of temperature sensors to ones of a plurality of temperature thresholds, wherein, for a particular comparison, one of the plurality of temperature thresholds used as a basis for comparison is dependent on a number of phase circuits currently active.

13. The method of claim 12, further comprising increasing the number of active ones of the plurality of phase circuits, using the control circuit, by a factor of two in response to a given temperature reading exceeding a particular one of the plurality of temperature thresholds.

14. The method of claim 12, further comprising:
activating a first subset of the plurality of phase circuits, using the control circuit, in response to receiving a first temperature reading greater than a first one of the plurality of temperature thresholds but less than a second one of the plurality of temperature thresholds; and activating a second subset of the plurality of phase circuits, using the control circuit, in response to receiving a second temperature reading greater than the second one of the plurality of temperature thresholds;

wherein the second one of the plurality of temperature thresholds is greater than the first one of the plurality of temperature thresholds; and wherein a number of phases of the second subset is greater than a number of phases of the first subset.

15. A system comprising:

a load circuit; and a power converter configured to provide a regulated supply voltage to the load circuit, wherein the power converter includes a plurality of phase circuits configured to provide a demand current to the load circuit, wherein the power converter further includes a control circuit configured to activate selected ones of the plurality of phase circuits based on the demand current; and a plurality of temperature sensors, wherein ones of the plurality of temperature sensors are associated with corresponding ones of the plurality of phase circuits; and wherein the control circuit includes comparison circuitry configured to compare temperature readings received from ones of the plurality of temperature sensors to ones of a plurality of temperature thresholds including a first temperature threshold, wherein the control circuit is configured to increase a number of active ones of the plurality of phase circuits in response to receiving a temperature reading from one of the temperature sensors that exceeds the first temperature threshold; and wherein the plurality of temperature thresholds includes a second temperature threshold greater than remaining ones of the plurality of temperature thresholds, wherein the control circuit is configured to activate all of the plurality of phase circuits in response to a temperature reading exceeding the second temperature threshold.

16. The system of claim 15, wherein the control circuit is configured to increase the number of active ones of the plurality of phase circuits by a factor of two in response to a given temperature reading exceeding a particular one of the plurality of temperature thresholds.

17. The system of claim 15, wherein a first subset of the plurality of phase circuits are implemented on a first integrated circuit die, and wherein a second subset of the plurality of phase circuits are implemented on a second integrated circuit die.

* * * * *